United States Patent
Abe et al.

(10) Patent No.: US 11,646,595 B2
(45) Date of Patent: May 9, 2023

(54) BATTERY PACK AND CONTROL METHOD THEREOF CAPABLE OF ADAPTIVELY SETTING MAXIMUM CURRENT VALUE

(71) Applicant: CANON KABUSHIKI KAISHA, Tokyo (JP)

(72) Inventors: Takamitsu Abe, Saitama (JP); Yuki Chishima, Kanagawa (JP); Kan Takaiwa, Tokyo (JP); Hideaki Nagano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 17/160,076

(22) Filed: Jan. 27, 2021

(65) Prior Publication Data
US 2021/0234392 A1 Jul. 29, 2021

(30) Foreign Application Priority Data

Jan. 29, 2020 (JP) .............................. JP2020-012883

(51) Int. Cl.
*H01M 10/44* (2006.01)
*H01M 10/46* (2006.01)
*H02J 7/00* (2006.01)
*H01M 50/583* (2021.01)
*H01M 10/42* (2006.01)

(52) U.S. Cl.
CPC ....... *H02J 7/00714* (2020.01); *H01M 10/425* (2013.01); *H01M 50/583* (2021.01); *H02J 7/0063* (2013.01); *H01M 2010/4271* (2013.01); *H01M 2220/30* (2013.01); *H02J 7/00032* (2020.01)

(58) Field of Classification Search
CPC .... H02J 7/00304; H02J 7/0031; H02J 7/0047; H02J 7/0063; H02J 7/00032; H01M 2220/30; H01M 2010/4271; H01M 10/425; H01M 50/583
USPC ........ 320/107, 114, 116, 117, 118, 120, 135, 320/136
See application file for complete search history.

(56) References Cited

U.S. PATENT DOCUMENTS

| 2009/0071675 | A1 | 3/2009 | Hanawa |
| 2013/0154549 | A1* | 6/2013 | Hanawa ............... H01M 50/572 429/7 |
| 2022/0085636 | A1* | 3/2022 | Abe ..................... H02J 7/0047 |

FOREIGN PATENT DOCUMENTS

| JP | 2001-286068 A | 10/2001 | |
| JP | 2019-004631 A | 1/2019 | |
| JP | 2022047802 A | * 3/2022 | .......... H01M 10/441 |

OTHER PUBLICATIONS

The above documents were cited in a European Search Report dated Jun. 23, 2021, that issued in the corresponding European Patent Application No. 21151497.1.

\* cited by examiner

*Primary Examiner* — Edward Tso
(74) *Attorney, Agent, or Firm* — Cowan, Liebowitz & Latman, P.C.

(57) ABSTRACT

A battery pack that is connectable to an electronic device is disclosed. The battery pack includes positive terminals, negative terminals, and a cutting unit. The cutting unit cuts a current that flows from a battery cell to the electronic device in a case where the current flowing from the battery cell to the electronic device exceeds a maximum current value. The battery pack further includes a control unit that changes the maximum current value based on the number of positive terminals and negative terminals that are connected to the electronic device.

11 Claims, 7 Drawing Sheets

F I G. 5A

| TYPES OF ELECTRONIC DEVICE | CAMERA A | CAMERA B | CHARGER | STROBE |
|---|---|---|---|---|
| NUMBER OF TERMINALS | 2 | 4 | 2 | 4 |

F I G. 5B

| DETECTED NUMBER | 2 | 4 |
|---|---|---|
| MAXIMUM CURRENT VALUE | 3A | 10A |

BATTERY PACK AND CONTROL METHOD THEREOF CAPABLE OF ADAPTIVELY SETTING MAXIMUM CURRENT VALUE

BACKGROUND

Technical Field

The present disclosure relates to a battery pack, a method for controlling the battery pack, and a program relating to a battery pack and a method for controlling the battery pack.

Description of the Related Art

A battery pack that supplies power to an electronic device includes a protection circuit for protecting a battery cell of the battery pack from overcurrent. If an electric current flowing to the battery cell exceeds the maximum value, the protection circuit can cut the electric current flowing to the battery cell by turning a switching element OFF.

Japanese Patent Laid-Open No. 2001-286068 describes changing a current value for determining whether or not to cut an electric current flowing from a positive terminal to a battery cell according to the temperature, voltage, or remaining capacity of the battery pack.

However, the battery pack described in Japanese Patent Laid-Open No. 2001-286068 is not a battery pack that includes positive terminals and negative terminals. Therefore, in a case where the battery pack described in Japanese Patent Laid-Open No. 2001-286068 is connected to an electronic device, the battery pack cannot change a current value for determining whether or not to cut an electric current flowing from the battery cell to the electronic device based on the number of positive terminals and negative terminals that are connected to the electronic device.

SUMMARY

According to an aspect of the embodiments, a device, a method, or a program that is capable of changing a current value for determining whether or not to cut a current flowing from a battery cell to an electronic device based on the number of positive terminals and negative terminals that are connected to the electronic device, is provided.

According to an aspect of the embodiments, there is provided a battery pack that is connectable to an electronic device, including positive terminals; negative terminals; a cutting unit that cuts a current that flows from a battery cell to the electronic device in a case where the current flowing from the battery cell to the electronic device exceeds a maximum current value; and a control unit that changes the maximum current value based on the number of positive terminals and negative terminals that are connected to the electronic device.

According to an aspect of the embodiments, there is provided a method including controlling a cutting unit of the battery pack to cut a current that flows from a battery cell to an electronic device in a case where the current flowing from the battery cell to the electronic device exceeds a maximum current value, wherein the battery pack includes positive terminals and negative terminals; and changing the maximum current value based on the number of positive terminals and negative terminals that are connected to the electronic device.

According to an aspect of the embodiments, there is provided a non-transitory storage medium that stores a program causing a computer to execute a method, the method including controlling a cutting unit of the battery pack to cut a current that flows from a battery cell to an electronic device in a case where the current flowing from the battery cell to the electronic device exceeds a maximum current value, wherein the battery pack includes positive terminals and negative terminals; and changing the maximum current value based on the number of positive terminals and negative terminals that are connected to the electronic device.

Further aspects of the embodiments will become apparent from the following embodiments.

BRIEF DESCRIPTION OF THE DRAWINGS

FIG. 5A is a diagram showing an example of a correspondence between the type of the electronic device 200 and the number of terminals.

FIG. 5B is a diagram showing a correspondence between the number of terminals and the maximum current value.

DESCRIPTION OF THE EMBODIMENTS

Exemplary embodiments, features, and aspects of the disclosure will be described below with reference to the drawings. However, aspects of the disclosure are not limited to the following embodiments.

Embodiment 1

Figure 1:
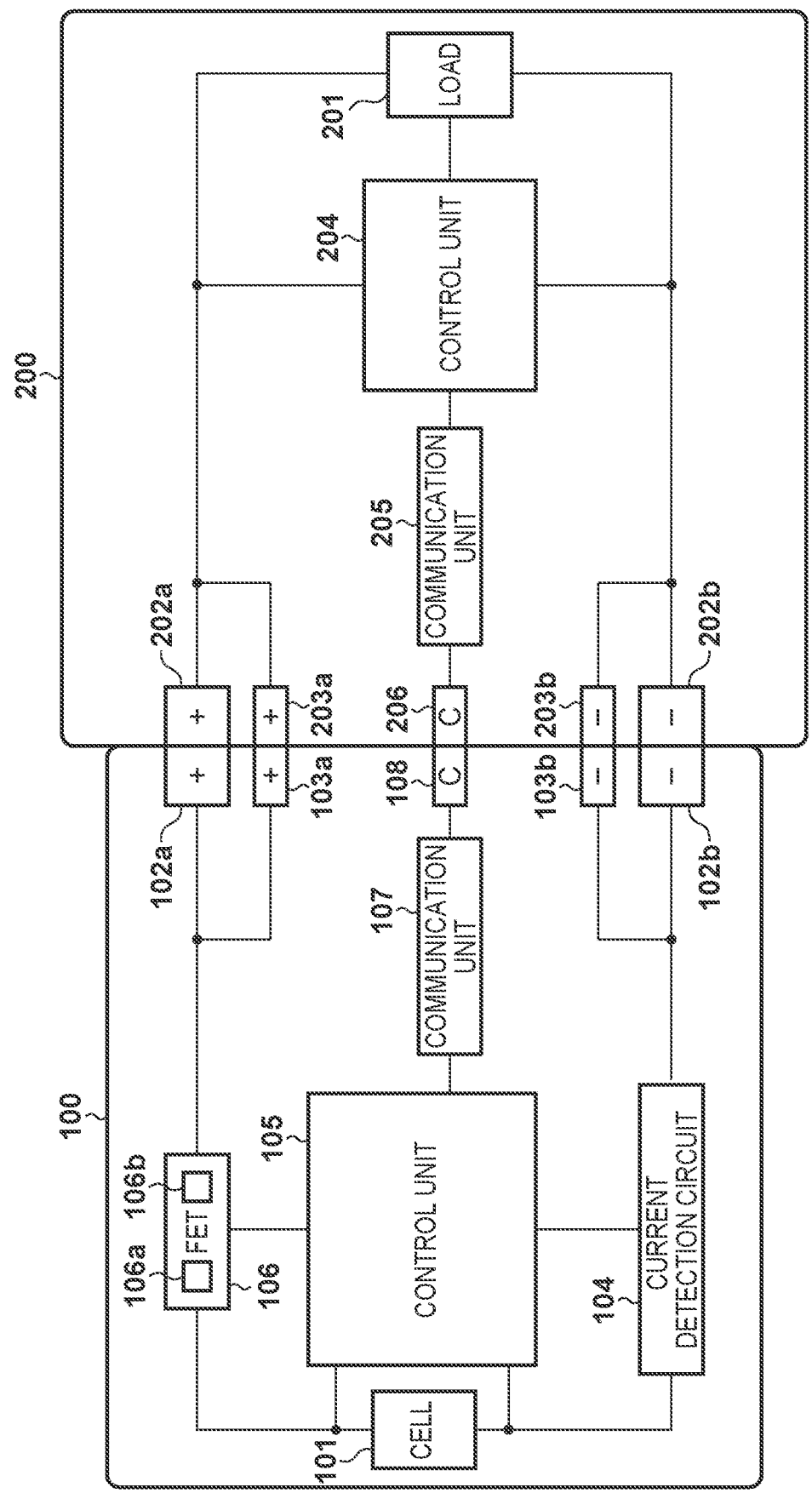
FIG. 1 is a block diagram showing components of a battery pack 100 and components of an electronic device 200 that is connectable to the battery pack 100.
Figure 6:
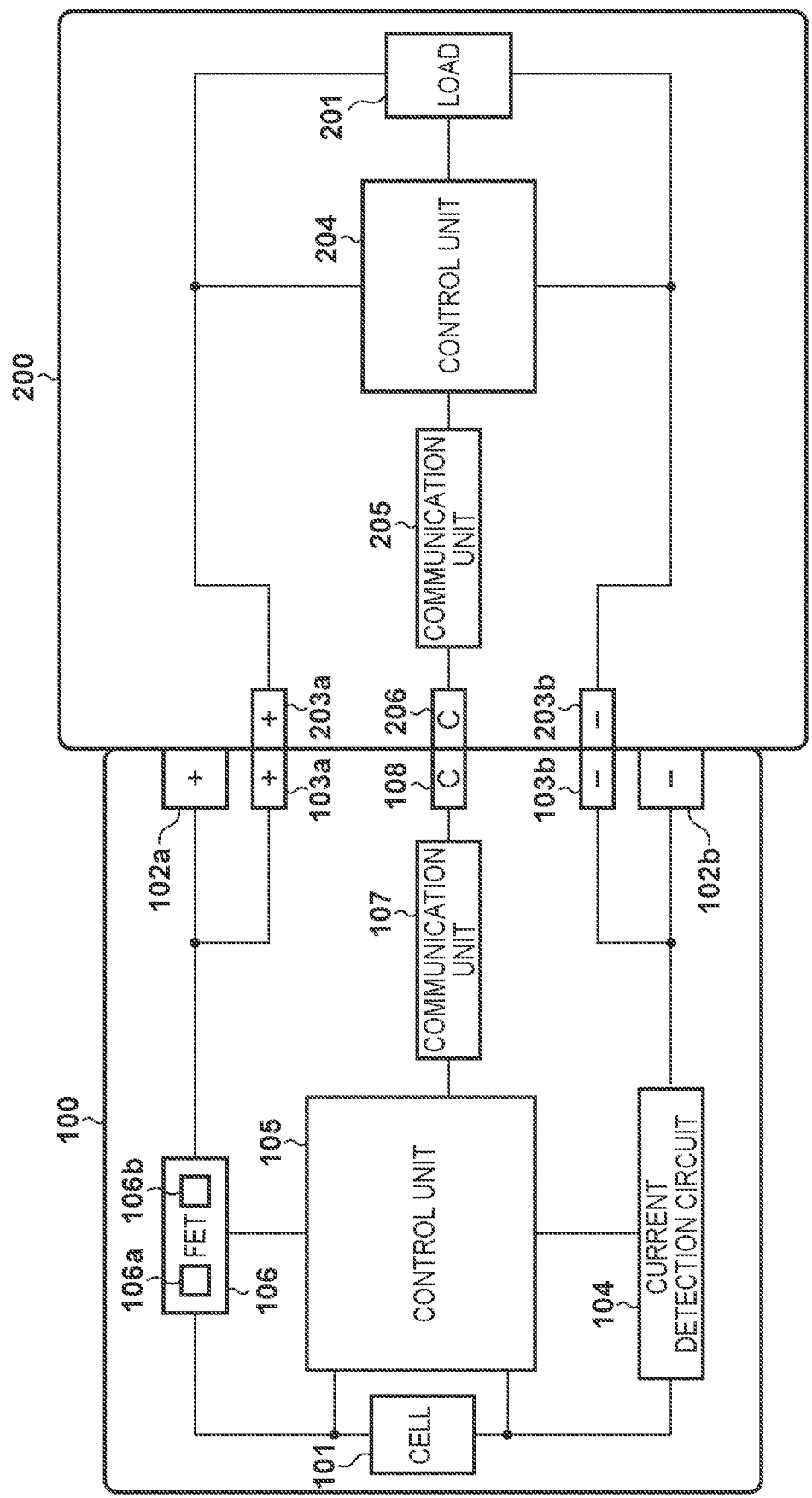
FIG. 6 is a block diagram showing components of the battery pack 100 and components of the electronic device 200 that is connectable to the battery pack 100.

FIGS. 1 and 6 are block diagrams showing components of a battery pack 100 and components of an electronic device 200 that is connectable to the battery pack 100.

The battery pack 100 is a battery pack that is connectable to the electronic device 200. The battery pack 100 is connected to the electronic device 200 as a result of being housed in a battery pack housing portion of the electronic device 200. The battery pack 100 includes a battery cell 101, a first positive terminal 102a, a first negative terminal 102b, a second positive terminal 103a, a second negative terminal 103b, a current detection circuit 104, a control unit 105, an FET unit 106, a communication unit 107, and a communication terminal 108.

The battery cell 101 is a rechargeable battery cell such as a lithium ion battery cell. The battery cell 101 includes one or more battery cells.

The first positive terminal 102a and the first negative terminal 102b are terminals that can sufficiently withstand an electric current of 5 A, for example. The second positive terminal 103a and the second negative terminal 103b are also terminals that can sufficiently withstand an electric current of 5 A, for example. In a case where the first positive terminal 102a and the first negative terminal 102b are connected to the electronic device 200, the battery cell 101 can supply an electric current of up to 5 A, for example, to the electronic device 200. In a case where the second positive terminal 103a and the second negative terminal 103b are connected to the electronic device 200 as well, the battery cell 101 can supply an electric current of up to 5 A, for example, to the electronic device 200. In a case where positive terminals and negative terminals that are connected to the electronic device 200 are the terminals 102a, 102b, 103a, and 103b, the battery cell 101 can supply an electric current of up to 10 A, for example, to the electronic device 200. Note that out of the first positive terminal 102a, the first negative terminal 102b, the second positive terminal 103a, and the second negative terminal 103b, terminals via which the battery pack 100 is connected to the electronic device 200 change according to the type of the electronic device 200.

The current detection circuit 104 is provided between the battery cell 101 and each of the first negative terminal 102b and the second negative terminal 103b, and detects an electric current that flows from the battery cell 101 to the electronic device 200 or an electric current that flows from the electronic device 200 to the battery cell 101. The current detection circuit 104 detects the electric current flowing from the battery cell 101 to the electronic device 200 or the electric current flowing from the electronic device 200 to the battery cell 101 based on the magnitude of a voltage drop, for example. The control unit 105 is informed of the electric current detected by the current detection circuit 104. Thus, the control unit 105 can be aware of the electric current flowing from the battery cell 101 to the electronic device 200 or the electric current flowing from the electronic device 200 to the battery cell 101.

The FET unit 106 includes a charge FET 106a and a discharge FET 106b. The charge FET 106a is a switch that is controlled by the control unit 105 to be turned ON or OFF. The discharge FET 106b is also a switch that is controlled by the control unit 105 to be turned ON or OFF. If the charge FET 106a is turned OFF and the discharge FET 106b is turned ON, an electric current flows from the battery cell 101 to the electronic device 200. In this case, the electric current flowing from the battery cell 101 to the electronic device 200 is cut as a result of the control unit 105 turning the discharge FET 106b OFF. If the charge FET 106a is turned ON and the discharge FET 106b is turned OFF, an electric current flows from the electronic device 200 to the battery cell 101. In this case, the electric current flowing from the electronic device 200 to the battery cell 101 is cut as a result of the control unit 105 turning the charge FET 106a OFF.

The communication unit 107 communicates with a communication unit 205 of the electronic device 200 via communication terminals 108 and 206. When the battery pack 100 is connected to the electronic device 200, the communication unit 107 is electrically connected to the communication unit 205 via the communication terminals 108 and 206.

The control unit 105 controls discharging and charging of the battery cell 101 and detects information regarding the battery cell 101 (the remaining charge, degradation state, temperature, etc., of the battery cell 101). The control unit 105 includes a memory and a processor, for example. The components of the battery pack 100 are controlled as a result of the processor of the control unit 105 executing a program that is stored in the memory of the control unit 105. The control unit 105 can be constituted by an integrated circuit such as an ASIC (Application Specific Integrated Circuit), for example. Information regarding the battery cell 101 (the remaining charge, degradation state, temperature, etc., of the battery cell 101) is detected by the processor of the control unit 105 and is stored in the memory of the control unit 105, for example.

The control unit 105 can control operations of the communication unit 107. The control unit 105 can communicate with a control unit 204 of the electronic device 200 by controlling operations of the communication unit 107. The control unit 105 can detect the number of positive terminals and negative terminals that are connected to the electronic device 200 based on information that is received from the control unit 204 via the communication terminal 108 and the communication unit 107.

The control unit 105 can control operations of the charge FET 106a and the discharge FET 106b. The control unit 105 can operate as a protection circuit that cuts an electric current flowing from the battery cell 101 to the electronic device 200 or an electric current flowing from the electronic device 200 to the battery cell 101 by controlling operations of the charge FET 106a and the discharge FET 106b. For example, the control unit 105 cuts an electric current flowing from the battery cell 101 to the electronic device 200 by turning the discharge FET 106b OFF upon determining that the electric current flowing from the battery cell 101 to the electronic device 200 has exceeded the maximum current value (a predetermined current value) of the battery pack 100.

The control unit 105 can monitor the voltage of the communication terminal 108. The control unit 105 determines whether or not a period during which the voltage of the communication terminal 108 does not exceed a first voltage value has exceeded a first predetermined period. Upon determining that the period during which the voltage of the communication terminal 108 does not exceed the first voltage value has exceeded the first predetermined period, the control unit 105 determines that the battery pack 100 has been detached from the electronic device 200. The control unit 105 determines whether or not a period during which the voltage of the communication terminal 108 is larger than a second voltage value has exceeded a second predetermined period. Upon determining that the period during which the voltage of the communication terminal 108 is larger than the second voltage value has exceeded the second predetermined period, the control unit 105 determines that the battery pack 100 has been connected to the electronic device 200. Here, the second voltage value is larger than or equal to the first voltage value. The second predetermined period is the same as or is different from the first predetermined period. The first voltage value, the second voltage value, the first predetermined period, and the second predetermined period are stored in the memory of the control unit 105.

The electronic device 200 is an electronic device that is connectable to the battery pack 100. The electronic device 200 includes a load circuit 201, at least one of a first positive terminal 202a and a second positive terminal 203a, at least one of a first negative terminal 202b and a second negative terminal 203b, the control unit 204, the communication unit 205, and the communication terminal 206. Which terminals of the first positive terminal 202a, the first negative terminal 202b, the second positive terminal 203a, and the second negative terminal 203b are included in the electronic device 200 changes according to the type of the electronic device 200. For example, the electronic device 200 shown in FIG.

1 includes the first positive terminal 202a, the first negative terminal 202b, the second positive terminal 203a, and the second negative terminal 203b. The electronic device 200 shown in FIG. 1 can receive an electric current of up to a first current value (e.g., 10 A) from the battery pack 100 via the first positive terminal 202a, the first negative terminal 202b, the second positive terminal 203a, and the second negative terminal 203b. For example, the electronic device 200 shown in FIG. 6 does not include the first positive terminal 202a and the first negative terminal 202b but includes the second positive terminal 203a and the second negative terminal 203b. The electronic device 200 shown in FIG. 6 can receive an electric current of up to a second current value (e.g., 3 A) from the battery pack 100 via the second positive terminal 203a and the second negative terminal 203b.

The configuration of the load circuit 201 changes according to the type of the electronic device 200. If the electronic device 200 is an electronic device that operates as a digital camera, for example, the load circuit 201 includes components (including an image capturing unit, an image processing unit, a recording unit, a reproduction unit, a display unit, etc.) that are necessary for the electronic device 200 to operate as the digital camera. If the electronic device 200 is an electronic device that operates as a charger, for example, the load circuit 201 includes components (including a voltage conversion unit, a charging unit, etc.) that are necessary for the electronic device 200 to operate as the charger.

The first positive terminal 202a is a terminal that is connected to the first positive terminal 102a of the battery pack 100, and the first negative terminal 202b is a terminal that is connected to the first negative terminal 102b of the battery pack 100. The second positive terminal 203a is a terminal that is connected to the second positive terminal 103a of the battery pack 100, and the second negative terminal 203b is a terminal that is connected to the second negative terminal 103b of the battery pack 100. The first positive terminal 202a and the first negative terminal 202b are terminals that can sufficiently withstand an electric current of 5 A, for example. The second positive terminal 203a and the second negative terminal 203b are also terminals that can sufficiently withstand an electric current of 5 A, for example. The communication terminal 206 is a terminal that is connected to the communication terminal 108 of the battery pack 100.

The communication unit 205 communicates with the communication unit 107 of the battery pack 100 via the communication terminals 108 and 206. When the battery pack 100 is connected to the electronic device 200, the communication unit 205 is electrically connected to the communication unit 107 via the communication terminals 108 and 206.

The control unit 204 controls the load circuit 201 and detects information regarding the load circuit 201. The control unit 204 includes a memory and a processor, for example. The components of the electronic device 200 are controlled as a result of the processor of the control unit 204 executing a program that is stored in the memory of the control unit 204. The control unit 204 can be constituted by an integrated circuit such as an ASIC (Application Specific Integrated Circuit), for example. Information (e.g., ID information of the electronic device 200) that indicates the type of the electronic device 200 is stored in the memory of the control unit 204.

The control unit 204 can control operations of the communication unit 205. The control unit 204 can communicate with the control unit 105 of the battery pack 100 by controlling operations of the communication unit 205. The control unit 204 transmits the information indicating the type of the electronic device 200 via the communication unit 205 and the communication terminal 206 to the control unit 105.

The control unit 204 can monitor the voltage of the first positive terminal 202a and the voltage of the second positive terminal 203a. The control unit 204 can detect the number of positive terminals and negative terminals that are connected to the battery pack 100 based on the voltage of the first positive terminal 202a and the voltage of the second positive terminal 203a. Upon detecting the number of positive terminals and negative terminals connected to the battery pack 100, the control unit 204 transmits information indicating the number of positive terminals and negative terminals connected to the battery pack 100, to the control unit 105 via the communication unit 205 and the communication terminal 206.

The electronic device 200 further includes a battery pack housing portion for housing the battery pack 100, a lid that is provided in the vicinity of an opening portion of the battery pack housing portion, and a lock mechanism that maintains connection between the battery pack 100 and the electronic device 200 even when the lid is open. The control unit 204 is configured to detect whether the lid of the battery pack housing portion is open or closed. Upon detecting that the lid of the battery pack housing portion is open, the control unit 204 transmits information indicating that the lid of the battery pack housing portion is open, to the control unit 105 via the communication unit 205 and the communication terminal 206.

Figure 2:
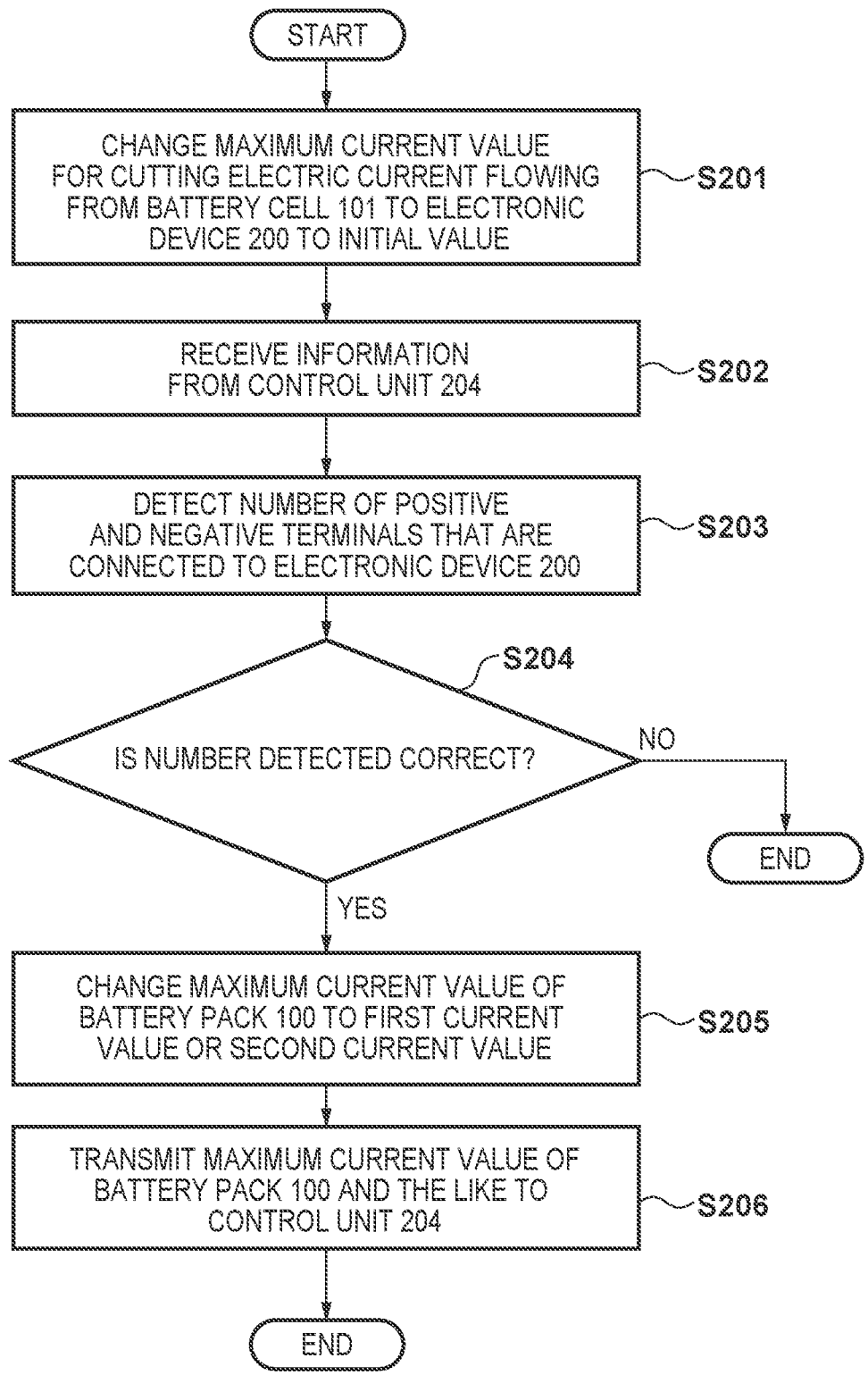
FIG. 2 is a flowchart relating to first change processing for changing the maximum current value of the battery pack 100.

Next, first change processing for changing the maximum current value of the battery pack 100 will be described with reference to the flowchart shown in FIG. 2. Note that the first change processing is started in a case where the control unit 105 has detected that the battery pack 100 is connected to the electronic device 200.

In step S201, the control unit 105 changes the maximum current value of the battery pack 100 to an initial value. The initial value is a current value that is the safest, and is the same as the second current value (e.g., 3 A) or is smaller than the second current value. Accordingly, upon determining that an electric current flowing from the battery cell 101 to the electronic device 200 has exceeded the initial value, the control unit 105 can cut the electric current flowing from the battery cell 101 to the electronic device 200 by turning the discharge FET 106b OFF. As described above, the maximum current value of the battery pack 100 is changed to the initial value to prevent an electric current flowing from the battery cell 101 to the electronic device 200 from exceeding the initial value. As a result, the control unit 105 can protect the battery cell 101, the first positive terminal 102a, the first negative terminal 102b, the second positive terminal 103a, and the second negative terminal 103b from overcurrent.

In step S202, the control unit 105 receives information for detecting the number of positive terminals and negative terminals that are connected to the electronic device 200 from the control unit 204 via the communication terminal 108 and the communication unit 107. The information for detecting the number of positive terminals and negative terminals connected to the electronic device 200 may be information indicating the type of the electronic device 200 or information indicating the number of positive terminals and negative terminals that are connected to the battery pack 100. A case will be described as an example in which the information for detecting the number of positive terminals and negative terminals connected to the electronic device 200 is information indicating the type of the electronic device 200. In this case, the control unit 204 transmits the information indicating the type of the electronic device 200, which is stored in the memory of the control unit 204, to the control unit 105. A case will be described as an example in which the information for detecting the number of positive terminals and negative terminals connected to the electronic device 200 is information indicating the number of positive terminals and negative terminals that are connected to the battery pack 100. In this case, the control unit 204 detects the number of positive terminals and negative terminals connected to the battery pack 100 based on a predetermined method, and transmits information indicating the detected number to the control unit 105.

In step S203, the control unit 105 detects the number of positive terminals and negative terminals that are connected to the electronic device 200 based on the information received in step S202. A case will be described as an example in which the information received in step S202 is the information indicating the type of the electronic device 200. In this case, the control unit 105 detects the number of terminals that corresponds to the type of the electronic device 200 as the number of positive terminals and negative terminals connected to the electronic device 200, based on a correspondence between the type of the electronic device 200 and the number of terminals. Note that the correspondence between the type of the electronic device 200 and the number of terminals is stored in the memory of the control unit 105 in advance. A case will be described as an example in which the information received in step S202 is the information indicating the number of positive terminals and negative terminals connected to the battery pack 100. In this case, the control unit 105 detects the number of positive terminals and negative terminals connected to the battery pack 100 as the number of positive terminals and negative terminals connected to the electronic device 200.

FIG. 5A shows an example of the correspondence between the type of the electronic device 200 and the number of terminals. If the control unit 105 has determined that the type of the electronic device 200 is a camera A or a charger, for example, the control unit 105 detects 2 as the number of positive terminals and negative terminals connected to the electronic device 200. If the control unit 105 has determined that the type of the electronic device 200 is a camera B or a stroboscope device, for example, the control unit 105 detects 4 as the number of positive terminals and negative terminals connected to the electronic device 200.

In step S204, the control unit 105 determines whether or not the number detected in step S203 is correct. If the number detected in step S203 matches either a first number (e.g., 4) or a second number (e.g., 2), the control unit 105 determines that the number detected in step S203 is correct. Here, the first number and the second number are stored in the memory of the control unit 105 in advance. If the number detected in step S203 does not match the first number (e.g., 4) and the second number (e.g., 2), the control unit 105 determines that the number detected in step S203 is not correct. In a case where the number of positive terminals and negative terminals connected to the electronic device 200 could not be detected in step S203 as well, the control unit 105 determines that the number detected in step S203 is not correct. If the control unit 105 has determined that the number detected in step S203 is correct, the control unit 105 proceeds to step S205. If the control unit 105 has determined that the number detected in step S203 is not correct, the flowchart shown in FIG. 2 ends in the state where the maximum current value of the battery pack 100 is the initial value. Note that, if the control unit 105 has determined that the number detected in step S203 is not correct, the control unit 105 may also transmit error information indicating that the number of positive terminals and negative terminals connected to the electronic device 200 could not be correctly detected, to the control unit 204.

In step S205, the control unit 105 changes the maximum current value of the battery pack 100 to a current value (a first current value or a second current value) that corresponds to the number detected in step S203, based on a correspondence between the number detected in step S203 and the maximum current value. Note that the correspondence between the number detected in step S203 and the maximum current value is stored in the memory of the control unit 105 in advance. FIG. 5B shows an example of the correspondence between the number (detected number) detected in step S203 and the maximum current value. As shown in FIG. 5B, the maximum current value becomes larger as the number (detected number) detected in step S203 becomes larger. If the number detected in step S203 is the second number (e.g., 2), for example, the control unit 105 changes the maximum current value of the battery pack 100 to the second current value (e.g., 3 A). If the number detected in step S203 is the first number (e.g., 4), for example, the control unit 105 changes the maximum current value of the battery pack 100 to the first current value (e.g., 10 A).

Thus, the control unit 105 can change the maximum current value of the battery pack 100 to the current value (the first current value or the second current value) corresponding to the number of positive terminals and negative terminals connected to the electronic device 200. As a result, the battery pack 100 can protect the battery cell 101, the first positive terminal 102a, the first negative terminal 102b, the second positive terminal 103a, and the second negative terminal 103b from overcurrent.

In step S206, the control unit 105 transmits information indicating the number detected in step S203 (which is equivalent to the number of positive terminals and negative terminals connected to the electronic device 200) to the control unit 204 via the communication unit 107 and the communication terminal 108. The control unit 105 further transmits information indicating the maximum current value changed in step S205 (which is equivalent to the current value corresponding to the number detected in step S203) to the control unit 204 via the communication unit 107 and the communication terminal 108. Thus, the control unit 204 can be aware of the number of positive terminals and negative terminals connected to the electronic device 200 and the maximum current value of the battery pack 100.

Figure 3:
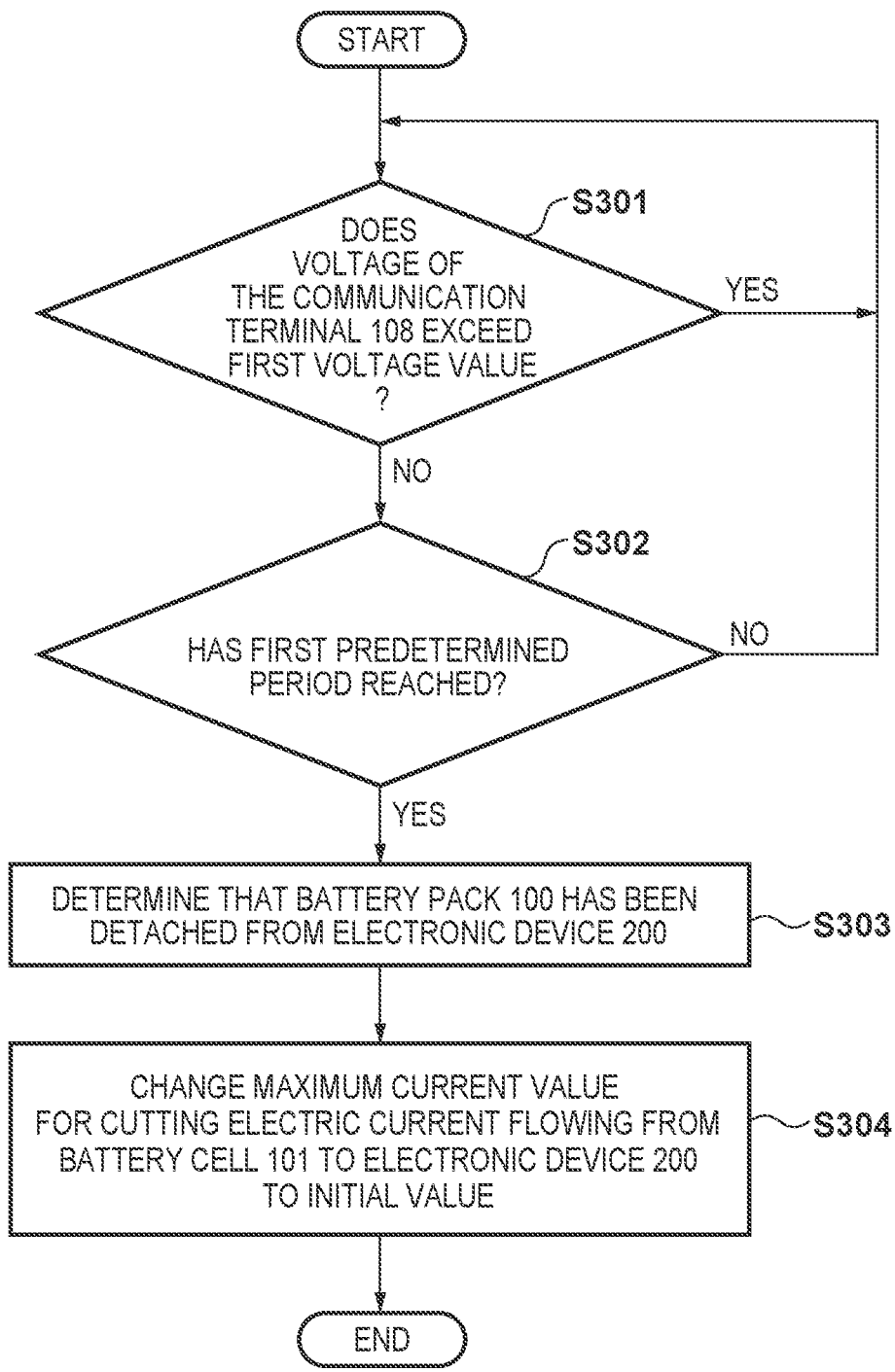
FIG. 3 is a flowchart relating to second change processing for changing the maximum current value of the battery pack 100.

Next, second change processing for changing the maximum current value of the battery pack 100 will be described with reference to the flowchart shown in FIG. 3. Note that the second change processing is started in a case where the battery pack 100 is connected to the electronic device 200.

In step S301, the control unit 105 determines whether or not the voltage of the communication terminal 108 exceeds the first voltage value. If the control unit 105 has determined that the voltage of the communication terminal 108 does not exceed the first voltage value, the control unit 105 proceeds to step S302. If the control unit 105 has determined that the voltage of the communication terminal 108 exceeds the first voltage value, the control unit 105 repeats step S301.

In step S302, the control unit 105 determines whether or not a period during which the voltage of the communication terminal 108 does not exceed the first voltage value has reached the first predetermined period. If the control unit 105 has determined that the period during which the voltage of the communication terminal 108 does not exceed the first voltage value has reached the first predetermined period, the control unit 105 proceeds to step S303. If the control unit 105 has determined that the period during which the voltage of the communication terminal 108 does not exceed the first voltage value has not reached the first predetermined period, the control unit 105 returns to step S301.

In step S303, the control unit 105 determines that the battery pack 100 has been detached from the electronic device 200.

In step S304, the control unit 105 changes the maximum current value of the battery pack 100 to the initial value described above. Accordingly, upon determining that an electric current flowing from the battery cell 101 to the electronic device 200 has exceeded the initial value, the control unit 105 can cut the electric current flowing from the battery cell 101 to the electronic device 200 by turning the discharge FET 106b OFF. As described above, the maximum current value of the battery pack 100 is changed to the initial value to prevent an electric current flowing from the battery cell 101 to the electronic device 200 from exceeding the initial value. As a result, the control unit 105 can protect the battery cell 101, the first positive terminal 102a, the first negative terminal 102b, the second positive terminal 103a, and the second negative terminal 103b from overcurrent.

Figure 4:
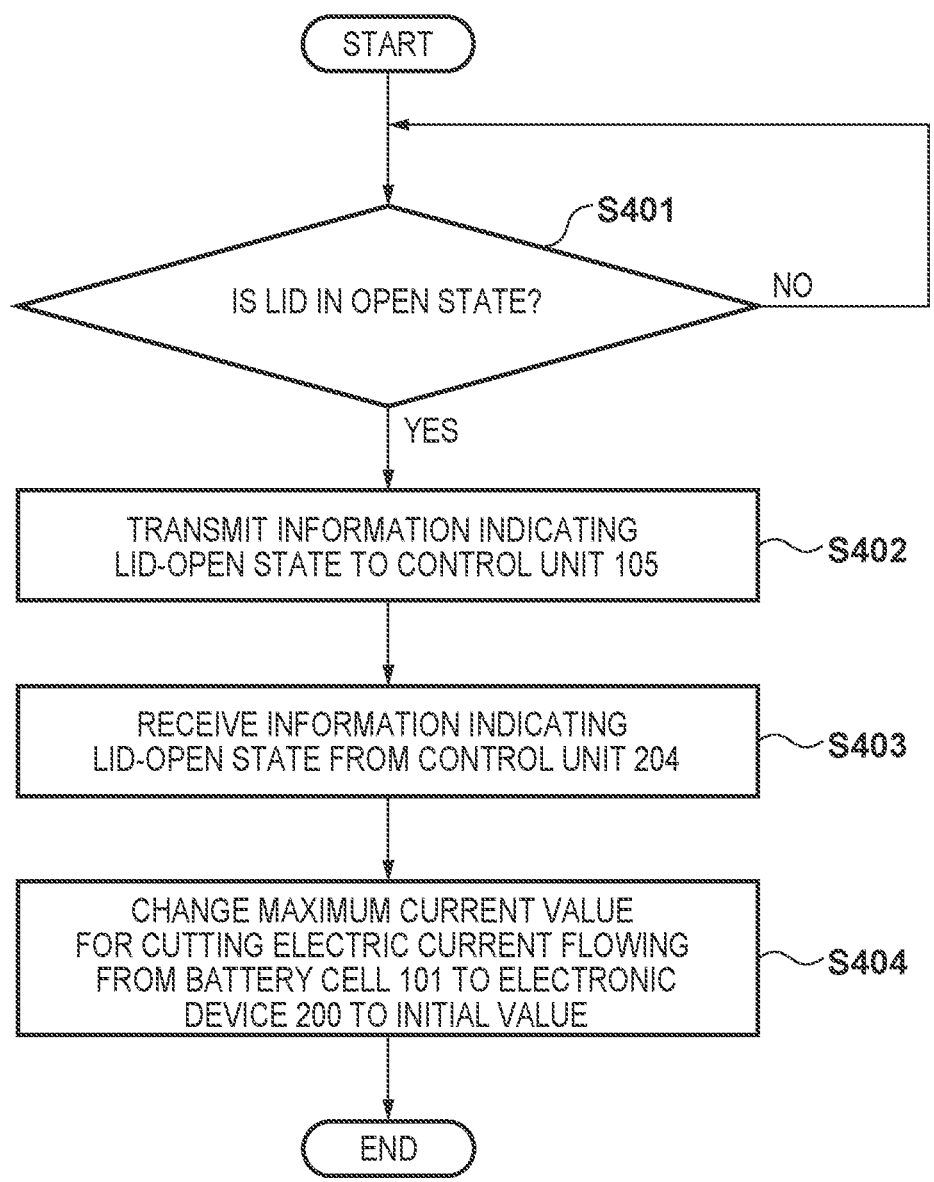
FIG. 4 is a flowchart relating to third change processing for changing the maximum current value of the battery pack 100.

Next, third change processing for changing the maximum current value of the battery pack 100 will be described with reference to the flowchart shown in FIG. 4. Note that the third change processing is started in a case where the battery pack 100 is connected to the electronic device 200.

In step S401, the control unit 204 detects whether the lid of the battery pack housing portion is open or closed. If the control unit 204 has detected that the lid of the battery pack housing portion is open, the control unit 204 determines that it is highly likely that the battery pack 100 will be detached from the electronic device 200, and proceeds to step S402. If the control unit 204 has detected that the lid of the battery pack housing portion is closed, the control unit 204 determines that it is not highly likely that the battery pack 100 will be detached from the electronic device 200, and repeats step S401. As described above, the control unit 204 determines whether or not it is highly likely that the battery pack 100 will be detached from the electronic device 200, by detecting whether the lid of the battery pack housing portion is open or closed. Note that another method may also be used to determine whether or not it is highly likely that the battery pack 100 will be detached from the electronic device 200. For example, the control unit 204 may also detect whether or not a predetermined operation that is performed before the battery pack 100 is detached has been performed, to determine whether or not it is highly likely that the battery pack 100 will be detached from the electronic device 200. In this case, the control unit 204 is configured to detect whether or not the predetermined operation that is performed before the battery pack 100 is detached has been performed.

In step S402, the control unit 204 transmits information indicating that the lid of the battery pack housing portion is open, to the control unit 105 via the communication unit 205 and the communication terminal 206. Furthermore, the control unit 204 may also suspend or end a portion of processing that is performed by the load circuit 201. For example, the control unit 204 may also suspend or end processing that consumes a large amount of power. For example, the control unit 204 may also end processing (processing for storing image data, settings of the electronic device 200, etc.) that is to be ended before the battery pack 100 is detached from the electronic device 200.

In step S403, the control unit 105 receives the information indicating that the lid of the battery pack housing portion is open, from the control unit 204 via the communication terminal 108 and the communication unit 107.

In step S404, the control unit 105 changes the maximum current value of the battery pack 100 to the initial value described above. Accordingly, upon determining that an electric current flowing from the battery cell 101 to the electronic device 200 has exceeded the initial value, the control unit 105 can cut the electric current flowing from the battery cell 101 to the electronic device 200 by turning the discharge FET 106b OFF. As described above, the maximum current value of the battery pack 100 is changed to the initial value to prevent an electric current flowing from the battery cell 101 to the electronic device 200 from exceeding the initial value. As a result, the control unit 105 can protect the battery cell 101, the first positive terminal 102a, the first negative terminal 102b, the second positive terminal 103a, and the second negative terminal 103b from overcurrent.

Note that, if the lid of the battery pack housing portion has been opened but is closed without the battery pack 100 being detached from the electronic device 200, the control unit 204 may also transmit information indicating that the lid of the battery pack housing portion is closed, to the control unit 105 via the communication unit 205 and the communication terminal 206. In this case, the control unit 105 performs the processing in step S202 and the following steps shown in FIG. 2 after receiving the information indicating that the lid of the battery pack housing portion is closed, from the control unit 204. As a result of the processing in step S202 and the following steps shown in FIG. 2 being performed, the maximum current value of the battery pack 100 can be changed to a current value that corresponds to the number of positive terminals and negative terminals connected to the electronic device 200.

As described above, according to Embodiment 1, the battery pack 100 can change the maximum current value of the battery pack 100 to the current value (the first current value or the second current value) corresponding to the number of positive terminals and negative terminals connected to the electronic device 200. As a result, the battery pack 100 can protect the battery cell 101, the first positive terminal 102a, the first negative terminal 102b, the second positive terminal 103a, and the second negative terminal 103b from overcurrent.

Variation of Embodiment 1

Figure 7:
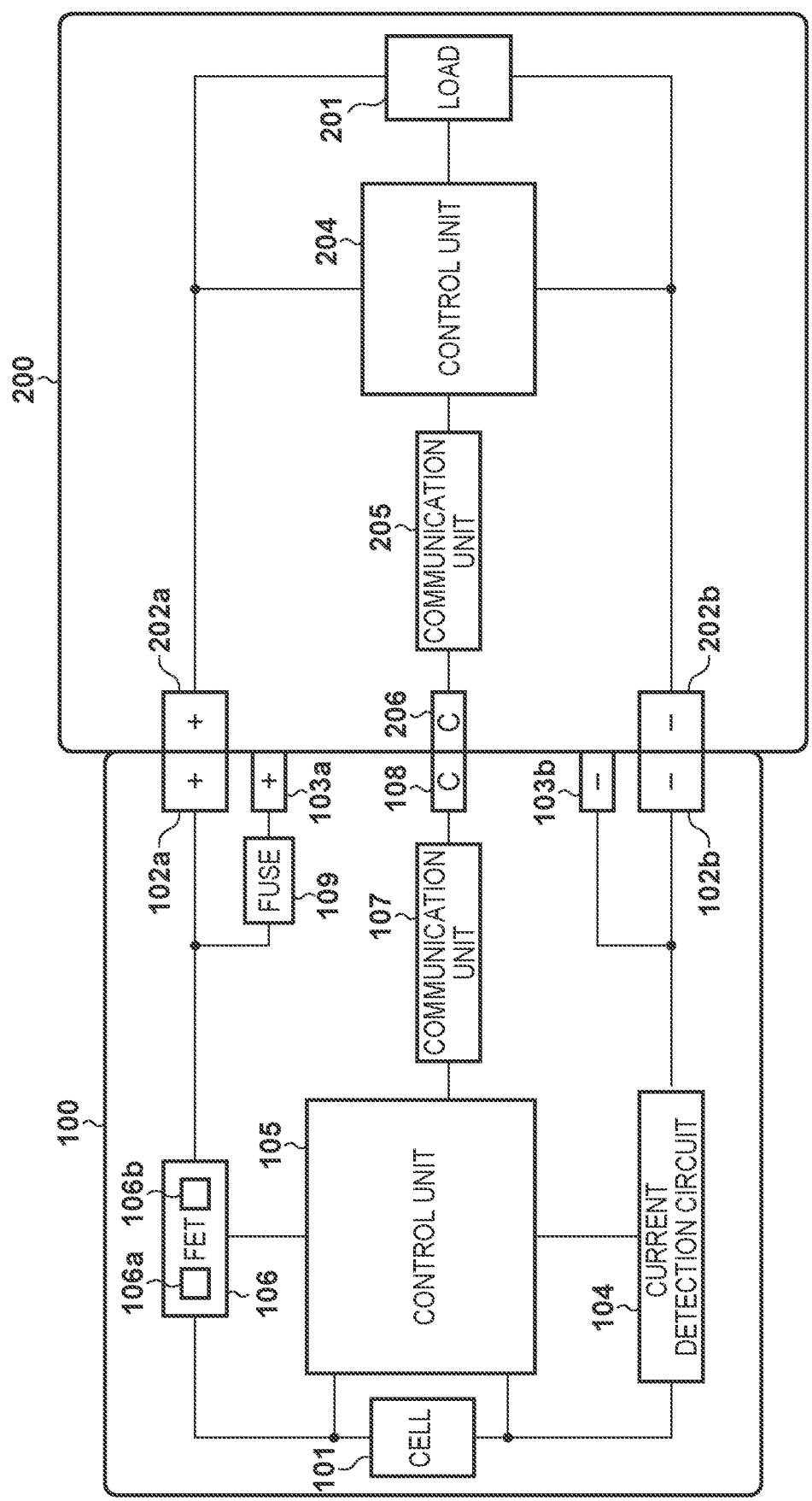
FIG. 7 is a block diagram showing another example of components of the battery pack 100 and components of the electronic device 200.

Next, a variation of Embodiment 1 will be described. FIG. 7 is a block diagram showing another example of components of the battery pack 100 and components of the electronic device 200. Note that among the components shown in FIG. 7, components that are similar to those shown in FIG. 1 are denoted with the same reference signs as those used in FIG. 1, and detailed descriptions of which are omitted. However, unlike the first positive terminal 102a and the first negative terminal 102b shown in FIG. 1, the first positive terminal 102a and the first negative terminal 102b shown in FIG. 7 are terminals that can sufficiently withstand an electric current of 10 A, for example. Unlike the control unit 105 shown in FIG. 1, the control unit 105 shown in FIG. 7 can also detect the type of positive terminals and negative terminals that are connected to the electronic device 200. The control unit 105 can detect the type of positive terminals and negative terminals connected to the electronic device 200 based on information for detecting the type of positive terminals and negative terminals connected to the electronic device 200, for example. The information for detecting the type of positive terminals and negative terminals connected to the electronic device 200 is information that is transmitted from the control unit 204 to the control unit 105, for example. The information for detecting the type of positive terminals and negative terminals connected to the electronic device 200 may be information indicating the type of the electronic device 200 or information indicating the type of positive terminals and negative terminals that are connected to the battery pack 100. A case will be described as an example in which the information for detecting the type of positive terminals and negative terminals connected to the electronic device 200 is information indicating the type of the electronic device 200. In this case, the control unit 204 detects, as the type of positive terminals and negative terminals connected to the electronic device 200, a type of positive terminals and negative terminals that corresponds to the type of the electronic device 200 based on a correspondence between the type of the electronic device 200 and the type of positive terminals and negative terminals. Note that the correspondence between the type of the electronic device 200 and the type of positive terminals and negative terminals is stored in the memory of the control unit 105 in advance. A case will be described as an example in which the information for detecting the type of positive terminals and negative terminals connected to the electronic device 200 is information indicating the type of positive terminals and negative terminals that are connected to the battery pack 100. In this case, the control unit 204 detects the type of positive terminals and negative terminals connected to the battery pack 100 based on a predetermined method, and transmits information indicating the detected type to the control unit 105 together with information indicating the number of positive terminals and negative terminals connected to the battery pack 100. The control unit 105 detects the type of positive terminals and negative terminals connected to the battery pack 100 as the type of positive terminals and negative terminals connected to the electronic device 200.

Unlike the battery pack 100 shown in FIG. 1, the battery pack 100 shown in FIG. 7 includes a fuse 109. The fuse 109 is provided between the second positive terminal 103a and the FET unit 106. The fuse 109 is configured to melt if an electric current that flows from the battery cell 101 to the second positive terminal 103a exceeds a current value (e.g., 6 A). Note that the current value at which the fuse 109 melts is set according to the performance of the second positive terminal 103a and the second negative terminal 103b. As a result of the fuse 109 being provided between the second positive terminal 103a and the FET unit 106, the second positive terminal 103a, the second negative terminal 103b, the battery pack 100, and the electronic device 200 can be protected even if an electric current of 10 A flows to the second positive terminal 103a and the second negative terminal 103b for some reason.

After detecting that the number of positive terminals and negative terminals connected to the electronic device 200 is the second number (e.g., 2), the control unit 105 detects the type of positive terminals and negative terminals connected to the electronic device 200 based on the information received from the control unit 204. Then, the control unit 105 changes the maximum current value of the battery pack 100 to the first current value or the second current value based on a correspondence between the type of positive terminals and negative terminals connected to the electronic device 200 and the maximum current value. Note that the correspondence between the type of positive terminals and negative terminals connected to the electronic device 200 and the maximum current value is stored in the memory of the control unit 105 in advance. If the first positive terminal 102a and the first negative terminal 102b are connected to the electronic device 200, for example, the control unit 105 changes the maximum current value of the battery pack 100 to the first current value (e.g., 10 A). If the second positive terminal 103a and the second negative terminal 103b are connected to the electronic device 200, for example, the control unit 105 changes the maximum current value of the battery pack 100 to the second current value (e.g., 3 A). Accordingly, if the first positive terminal 102a and the first negative terminal 102b are connected to the electronic device 200, the battery cell 101 can supply an electric current of up to the first current value (e.g., 10 A) to the electronic device 200. On the other hand, if the second positive terminal 103a and the second negative terminal 103b are connected to the electronic device 200, the battery cell 101 can supply an electric current of up to the second current value (e.g., 3 A) to the electronic device 200. Note that if positive terminals and negative terminals that are connected to the electronic device 200 are the terminals 102a, 102b, 103a, and 103b, the battery cell 101 can supply an electric current of up to the first current value (e.g., 10 A) to the electronic device 200.

Unlike the electronic device 200 shown in FIG. 1, the electronic device 200 shown in FIG. 7 does not include the second positive terminal 203a and the second negative terminal 203b, but includes the first positive terminal 202a and the first negative terminal 202b. As described above, if the first positive terminal 102a and the first negative terminal 102b are connected to the electronic device 200, the control unit 105 changes the maximum current value of the battery pack 100 to the first current value (e.g., 10 A). Accordingly, the battery cell 101 can supply an electric current of up to the first current value (e.g., 10 A) to the electronic device 200. The electronic device 200 shown in FIG. 7 can receive an electric current of up to the first current value (e.g., 10 A) from the battery pack 100 via the first positive terminal 202a and the first negative terminal 202b.

Embodiment 2

The various functions, processes, or methods described in Embodiment 1 can also be implemented as a result of a personal computer, a microcomputer, a CPU (Central Processing Unit), or a processor executing a program. In Embodiment 2, the personal computer, the microcomputer, the CPU, or the processor will be referred to as a "computer X". Also, in Embodiment 2, the program for controlling the computer X and implementing the various functions, processes, or methods described in Embodiment 1 will be referred to as a "program Y".

The various functions, processes, or methods described in Embodiment 1 are implemented as a result of the computer X executing the program Y. In this case, the program Y is supplied to the computer X via a computer-readable storage medium. The computer-readable storage medium in Embodiment 2 includes at least one of a hard disk device, a magnetic storage device, an optical storage device, a magneto-optical storage device, a memory card, a volatile memory, a non-volatile memory, or the like. The computer-readable storage medium in Embodiment 2 is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-012883, filed on Jan. 29, 2020, which is hereby incorporated by reference herein in its entirety.

What is claimed is:

1. A battery pack that is connectable to an electronic device, comprising:
   positive terminals;
   negative terminals;
   a processor that executes a program stored in a memory and causes the battery pack to function as:
   a cutting unit that cuts a current that flows from a battery cell to the electronic device connected to the battery pack in a case where the current flowing from the battery cell to the electronic device exceeds a maximum current value;
   a communication unit that communicates with the electronic device connected to the battery pack and receives, from the electronic device, information for detecting the number of the positive terminals and the negative terminals that are connected to the electronic device;
   a detection unit that detects the number of the positive terminals and the negative terminals that are connected to the electronic device in accordance with the information received by the communication unit; and
   a control unit that sets the maximum current value based on the number of the positive terminals and the negative terminals that are connected to the electronic device detected by the detection unit.

2. The battery pack according to claim 1, wherein the control unit sets the maximum current value to a first current value in a case where the number of positive terminals and negative terminals connected to the electronic device is a first number, and
   wherein the control unit sets the maximum current value to a second current value that is smaller than the first current value in a case where the number of positive terminals and negative terminals connected to the electronic device is a second number that is smaller than the first number.

3. The battery pack according to claim 2, wherein the control unit sets the maximum current value to a value that is no greater than the first current value, in a state where the battery pack is connected to the electronic device.

4. The battery pack according to claim 2, wherein the control unit sets the maximum current value to a current value that is the same as the second current value or is smaller than the second current value, in a state where the battery pack is detached from the electronic device.

5. The battery pack according to claim 2, wherein the control unit sets the maximum current value to a current value that is the same as the second current value or is smaller than the second current value in a case where it is detected that a battery pack housing is open, and
   wherein the battery pack housing is included in the electronic device.

6. The battery pack according to claim 1, wherein the information received from the electronic device indicates the number of terminals of the electronic device that are connected to the battery pack.

7. The battery pack according to claim 1, wherein the information received from the electronic device indicates a type of the electronic device.

8. The battery pack according to claim 1, wherein one of a plurality of types of electronic devices is connected to the battery pack,
   wherein the plurality of types of electronic devices include a first type of the electronic device having a first number of terminals to be connected to the battery pack and a second type of the electronic device having a second number of terminals to be connected to the battery pack, and
   wherein the first number is different from the second number.

9. The battery pack according to claim 8, wherein the plurality of types of electronic device include two or more of a camera, a charger and a stroboscope device.

10. A control method of a battery pack that has positive terminals and negative terminals, comprising:
   controlling a cutting unit of the battery pack to cut a current that flows from a battery cell to an electronic device connected to the battery pack in a case where the current flowing from the battery cell to the electronic device exceeds a maximum current value;
   receiving, from the electronic device, information for detecting the number of the positive terminals and the negative terminals that are connected to the electronic device via a communication with the electronic device;
   detecting the number of the positive terminals and the negative terminals that are connected to the electronic device in accordance with the received information; and
   setting the maximum current value based on the number of positive terminals and negative terminals that are connected to the electronic device detected in the detecting.

11. A non-transitory storage medium that stores a program causing a computer to execute a method, the method comprising:
   controlling a cutting unit of the battery pack to cut a current that flows from a battery cell to an electronic device connected to the battery pack in a case where the current flowing from the battery cell to the electronic device exceeds a maximum current value;
   receiving, from the electronic device, information for detecting the number of the positive terminals and the negative terminals that are connected to the electronic device via a communication with the electronic device;
   detecting the number of the positive terminals and the negative terminals that are connected to the electronic device in accordance with the received information; and
   setting the maximum current value based on the number of positive terminals and negative terminals that are connected to the electronic device detected in the detecting.

* * * * *